June 17, 1952  C. A. PERSONS  2,600,915
SPRING MOUNTING MEANS FOR SADDLE SEATS
Filed Nov. 29, 1947  2 SHEETS—SHEET 1

INVENTOR.
Charles A. Persons
BY Charles R. Fay,
atty.

June 17, 1952  C. A. PERSONS  2,600,915
SPRING MOUNTING MEANS FOR SADDLE SEATS
Filed Nov. 29, 1947  2 SHEETS—SHEET 2
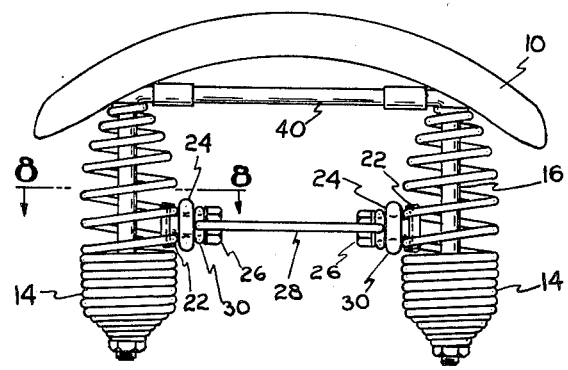
Fig. 7
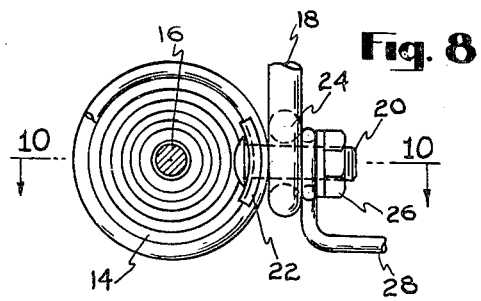
Fig. 9
Fig. 8
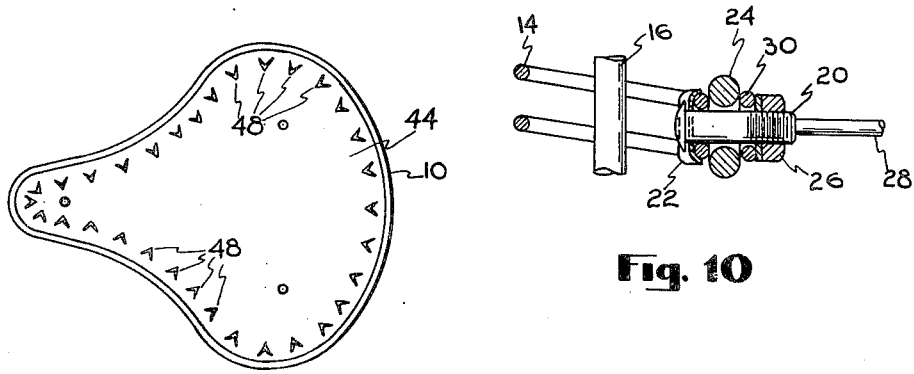
Fig. 10
Fig. 11
INVENTOR.
Charles A. Persons
BY
Charles R. Fay,
atty.

Patented June 17, 1952

2,600,915

UNITED STATES PATENT OFFICE 2,600,915

SPRING MOUNTING MEANS FOR SADDLE SEATS

Charles A. Persons, Worcester, Mass.; Harriet M. Persons and The Mechanics National Bank of Worcester, executors of Charles A. Persons, deceased, assignors to Persons-Majestic Mfg. Co., Worcester, Mass., a corporation of Massachusetts Application November 29, 1947, Serial No. 788,906

3 Claims. (Cl. 155—5.22)

This invention relates to saddles for bicycles, tricycles, motorcycles and other wheeled vehicles which for further reference and convenience will be simply referred to as saddles.

The principal object of the invention is to provide a saddle of the spring type having a degree of simplicity, ease of assembly, permanence of construction and economy of manufacture beyond any device of this sort previously known.

A further object of the invention is the provision of a novel attachment of the customary coiled front spring to the base or supporting spring, wherein these springs are connected without the use of the bolt and nut heretofore used for attaching the two springs together; and a novel connection for these springs so that the front spring, which attaches to the top or seat of the saddle, will depress and yield to a blow or bounce on the front of the saddle yet return instantly to its normal position upon the pressure thereon being released.

Another object of the invention resides in the elimination of the special headed bolt for attaching the rear of the base or supporting spring to the rear vertical springs. For mechanical soundness and durability it is necessary to connect the vertical springs by at least two of their coils, this requiring specially headed and costly bolts. As an improvement, I add a small sheet metal clip flanged and curved with an outside radius equal to the inside radius of the springs and use an ordinary headed bolt which passes through a hole in this clip and an eye in the base supporting spring and in this manner partly encircle two or more of the vertical spring coils and lock the vertical spring and the base spring permanently together through the use of an ordinary nut on the bolt.

A further object of the invention resides in a new and improved construction for the seat of the saddle. Seat saddles are made of two types, the older consisting of a molded top covering as leather or leatheroid, ordinary padding molded to a formed steel plate, and fabric underneath the top. The fabric or leather portions are trimmed and their edges bound with gimp which is stitched through the fabric around the entire periphery.

Another and more widely used method consists of the top being made of leather or imitation leather, padding, and a light steel plate. The periphery of this top, flexible material is turned inwardly and a light, small metal bottom plate is clamped or bolted down so the periphery or edge of the top material is gripped between the two metal plates. However, it has been a problem in the past to keep the flexible top material from working out from between the two plates, therefore, I add a series of pointed projections in the bottom plate with the points projecting in and upwardly so that when the complete top is assembled under pressure, as in a mold, these pointed projections grip the fabric or leather and draw it tight into the underneath side of the intermediate plate and hold it there permanently. This construction further obviates the common use of glue, latex or similar adhesives. The bottom plate, formed to register with the upper plate, is locked to the upper plate by either of two different methods. The first method is to lock the upper plate to the bottom plate by the use of clamps which consist of tongues of metal originally formed downward from the intermediate plate and passing through corresponding slots in the lower plate. In assembly these tongues are turned outwardly to retain the inner and outer plates in tight relation. In an alternate method the toothed lower plate is retained in tight relation to the upper plate, with the turned in saddle covering between the two plates, through the use of the bolts which attach the entire top to the springs.

Other objects and advantages of the invention will appear hereinafter.

Reference is to be had to the accompanying drawings in which

Fig. 7 is a rear view of the cycle saddle incorporating my invention and looking in the direction of arrow 7 in Fig. 1;

Fig. 8 is an enlarged view taken on line 8—8 of Fig. 7 which shows the construction of the rear spring connection;

Fig. 9 is a detail view of the small formed metal plate in the connection;

Fig. 10 is a sectional view taken on line 10—10 of Fig. 8 further illustrating the spring connection; and

Figure 1:
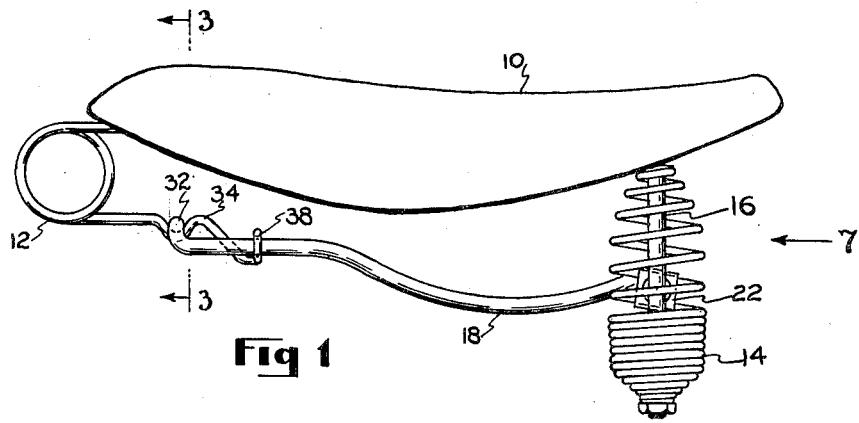
Fig. 1 is a view in side elevation of a cycle saddle incorporating my invention.
Figure 2:
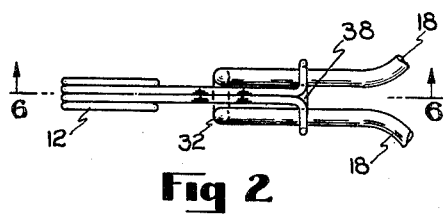
Fig. 2 is a bottom view of the front spring hinged connection.

Fig. 11 is a bottom view of the saddle seat which illustrates the series of pointed projections.

The saddle top 10, which may be of any suitable construction and materials, is mounted on a spring set which consists of a front spring 12, usually a nose coil, a pair of coil compression-extension springs 14, suspended from the rear of the saddle top 10 by rods 16, and a suitable frame, or supporting spring 18 which has two runs and extends from the front springs 12 to the rear springs 14 and is attached to these springs by bolts 20, as shown in Figs. 8 and 9. The compression-extension springs 14 are secured to the supporting spring 18 by means of a small curved and flanged sheet metal clip or plate 22, which grips two of the coils of the vertical springs 14, between the flanges, bolt 20 passing through a hole in the clip and an eye 24 which is formed in the end of each run of the supporting spring 18. In this manner the vertical springs 14 are permanently locked together with the supporting spring 18 by use of a conventional nut 26 on the bolt 20.

A cross brace rod 28 is eyed at both ends as at 30, and the bolts pass therethrough, also. By the use of the clip 22 it is possible to use a single compound spring at each end of rod 28 as the vertical spring 14 instead of two separate springs as as been used heretofore. This construction greatly facilitates assembly, a single pair of compound springs giving the comfort and resilience during riding only obtainable previously by use of two pairs of springs, one pair being compression springs and the other pair being extension springs.

The forward portion of the supporting spring 18 is hingedly connected to the front spring 12. The supporting spring 18, comprising a pair of spaced stiff wires or runs, the forward portions of which form a generally U-shaped joint, has its extreme forward portion bent upward into an L shape portion as at 32, forming a crosspocket open at the bottom.

Figure 6:
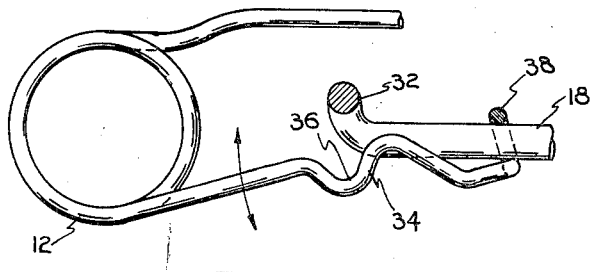
Fig. 6 is an enlarged sectional view taken on line 6—6 of Fig. 2 which illustrates the resilient action of the nose coil assembly.

The lower end of the front spring 12 extends rearwardly and is formed with a double or S curve at 34 which receives the L shape 32 of the supporting spring 18. The portion 32 of the spring 18 normally rests in the forward curve or pocket 36 of this double curve. The rear extremity of the front spring 12 is formed into an eye 38 of a suitable size and shape to pass the end of the supporting spring 18 and said eye 38 is bent upward at such an angle as to retain the supporting spring and yet allow a certain freedom of movement as illustrated by Figs. 1 and 6. Thus the supporting spring 18 is assembled to the front spring 12 by passing the portion 32 through the front spring eye 38 and sliding it forwardly until the portion 32 can be dropped into the retaining curve 36, although fastened to the saddle seat at one end.

In this assembled relation the front spring 12 is free to hinge downwardly about the eye 38 under a blow or bounce at the pommel, but its upward movement is checked by contact with the portion 32 of the supporting spring 18, and the opening of the eye 38 is of such a size that the two parts will be retained in their proper relation by friction and cannot become disassembled in riding. The resilience of spring 12 returns the seat to up position upon relief of downward pressure on the pommel.

A comparison of Figs. 1 and 6 show how the resilience of the pommel is obtained. Fig. 1 shows the condition of the spring 12 when the seat is unweighted, the tension of the spring causing it to abut the supporting spring 18 at the portion 38. When the pommel receives a shock load, as illustrated in Fig. 6, the eyed end 38 of the spring acts as a pivot but this end of the spring does not bend. All the give is in the coil of the front spring 12, which easily resumes normal position when the load is removed, because its limit of deformation cannot be reached even in extremely rough riding or accident.

The rear springs 14 are a combination of compression and extension with the upper portions thereof being open wound coil and the lower portions of close wound coil, which are attached to the saddle plates by means of a rod 40 connecting rods 16, locked thereto.

Figure 3:
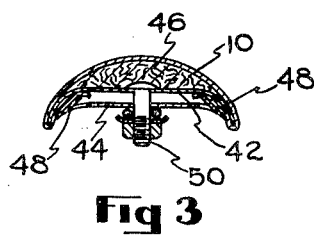
Fig. 3 is a sectional view taken on line 3—3 of Fig. 1 which shows the gripping action of the pointed projections.

Fig. 3 illustrates the method of securely fastening the molded leather or imitation leather top 10 to the frame of the saddle which consists of an inner plate 42, an outer plate 44 and the spring type frame previously described. In assembling, the top 10, previously molded to the desired shape and filled with suitable cushioning material 46, such as a felt pad, is placed over the intermediate steel plate 42. The edges of the top 10 are folded over and around the intermediate plate 42 and over this is placed the outer steel plate 44 having a series of pointed projections 48, these projections having their points projecting inwardly and upwardly. When the outer toothed plate 44 is pressed together with the inner plate 42, the folded over edges of the top 10 being between both plates, the projections 48 grip the top 10 drawing it in and securely locking it between the two plates. The two plates are fastened together by use of a headed bolt 50 which passes through a hole in the inner plate and a matching hole in the outer plate. The whole seat is assembled together with the spring frame assembly and locked together with the use of a nut on the headed bolt 50.

Figure 4:
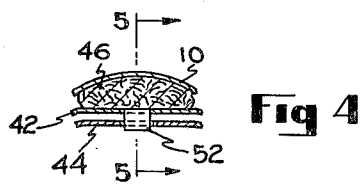
Fig. 4 is a sectional view similar to Fig. 3 which shows a method of locking the two steel plates together.
Figure 5:
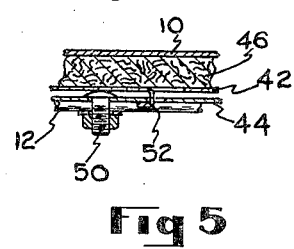
Fig. 5 is a sectional view taken on line 5—5 of Fig. 4.

An alternative method of attaching the intermediate plate to the toothed plate is shown in Figs. 4 and 5. The intermediate plate is lanced out in several places to form tongues 52, attached at one end, while the outer plate has matching slots or holes to accept the tongues. In assembly when pressing the plates together the tongues are inserted through the slots and then bent backward over the outer plate securely fastening the two plates together.

Having thus described my invention and the advantages thereof, I do not wish to be limited to the details herein disclosed otherwise than as set forth in the claims, but what I claim is:

1. In a saddle, a saddle top, a longitudinal supporting spring frame connected at its forward end to said saddle top, a spring depending from the saddle top at the rear end of said frame, a curved clip, the outside radius of said clip conforming to the inside radius of the spring, said clip having flanges to straddle at least two coils of said spring, a headed bolt passing through a hole in said clip and an eye formed in the end of the longitudinal spring frame, and a nut on the bolt securing the clip, spring, and frame together.

2. A saddle comprising a seat, a spring frame therefor, said frame being resiliently secured to the seat at the rear end thereof, and a spring connection between the front of the seat and said frame, said connection comprising a spring secured to the seat and terminating in an eye, the front end of the frame being received in the eye and provided with a turned up extreme tip, the spring having a depression therein receiving the tip, the latter limiting upward movement of the spring and the eye forming a pivot for downward movement of the spring, the latter being normally in uppermost position as limited by the spring frame tip.

3. The saddle recited in claim 2 in which said eye is elongated to a width and length to accommodate said frame, allowing a certain freedom of movement between said parts whereby normal pivoting of the eye on said frame will fail to disengage the parts, said spring also having a reverse curve of a form to restrain said frame in the normal position against longitudinal movement.

CHARLES A. PERSONS.

REFERENCES CITED

The following references are of record in the file of this patent:

UNITED STATES PATENTS

| Number | Name | Date |
|---|---|---|
| 822,403 | Sweeney | June 5, 1906 |
| 1,188,481 | Persons | June 27, 1916 |
| 1,538,542 | Blake | May 19, 1925 |
| 1,975,405 | Pryale | Oct. 2, 1934 |
| 2,013,353 | Linder | Sept. 3, 1935 |
| 2,013,624 | Brandt | Sept. 3, 1935 |
| 2,288,163 | Kalter | June 30, 1942 |
| 2,354,328 | Mesinger | July 25, 1944 |